United States Patent Office 3,580,896
Patented May 25, 1971

1

3,580,896
AQUEOUS SUSPENSION POLYMERIZATION OF VINYL HALIDE POLYMERS IN THE PRESENCE OF ACRYLIC ACID
Elliott Farber, Trenton, N.J., assignor to Tenneco Chemicals, Inc.
No Drawing. Filed Mar. 6, 1968, Ser. No. 710,758
Int. Cl. C08f *15/30, 15/08, 15/26*
U.S. Cl. 260—87.1                                       8 Claims

ABSTRACT OF THE DISCLOSURE

Vinyl halide polymers are prepared in the form of uniform very small particles by incorporating in the monomer component of the polymerization mixture about 0.5 percent to 20 percent and preferably 1 percent to 10 percent by weight of acrylic acid, methacrylic acid, or mixtures thereof. Both the particle size and particle size distribution of vinyl halide homopolymers and copolymers with, for example, vinyl acetate, can be controlled in this way.

---

This invention relates to vinyl halide polymers and to a process for their production. More particularly, it relates to the production of vinyl chloride polymers in the form of uniform small particles.

In the preparation of vinyl halide polymers by the suspension polymerization technique, the monomers are polymerized in an aqueous medium containing a dispersing agent to form granules the polymers, which are then separated from the polymerization medium by filtration. For the polymer to be useful commercially the particles formed should be of a uniform small size. As used herein, "suspension polymerization technique" means a process in which an oil-soluble initiator is used and in which free-radical initiation does not start in the aqueous phase.

A number of methods have been suggested for the control of the particle size and particle size distribution of vinyl halide polymers prepared by suspension polymerization techniques. These include the addition of various polymeric protective colloids and surfactants to the polymerization medium as well as variations in the type and degree of agitation in the polymerization reactor. None of these has proven entirely satisfactory because some do not yield the desired uniform small particles, while others are undesirable in that they have an adverse effect on the stability and other properties of the polymers.

In accordance with this invention, it has been found that vinyl halide resins can be obtained in the form of uniform, very small particles by polymerizing a vinyl halide monomer alone or in admixture with comonomers in the presence of a small amount of acrylic acid, methacrylic acid, or mixtures thereof. In addition to having the desired particle size and particle size distribution, the polymers obtained are characterized by excellent stability, adhesion, and other valuable properties.

The vinyl halide polymers of this invention are prepared by polymerizing a mixture of monomers that contains a vinyl halide and at least 0.5 percent by weight of a particle size reducing agent, which is acrylic acid and/or methacrylic acid. 20 percent or more of the acid may be present in the mixture of monomers, but the use of these larger amounts does not result in corresponding improvements in the particle size and particle size distribution of the polymers and may have an adverse effect on their other properties. In most cases about 1 percent to 10 percent by weight of the particle size reducing agent is used, with particularly advantageous results being obtained when the monomer mixture contained about 2 percent by weight of acrylic acid or about 1 percent by weight of methacrylic acid. If desired, mixtures of acrylic acid and methacrylic acid can be used in the practice of this invention.

When the amount of acrylic acid and/or methacrylic acid in the monomer mixture is less than about 5 percent by weight, it is necessary that the polymerization medium contain an anionic surfactant if a granular polymer having the desired uniform and extremely fine particle size is to be produced. The choice of the anionic surfactant is not critical, and excellent results have been obtained using a wide variety of anionic surfactants including sodium, potassium and ammonium sulfonates, sulfates, organic phosphates and the like. Illustrative of these surfactants are the following: sodium decylbenzene sulfonate, sodium dodecylbenzene sulfonate, potassium dibutylnaphthalene sulfonate, ammonium diisopropylnaphthalene sulfonate, sodium lauryl sulfate, sodium cetyl sulfate, sodium oleyl sulfate, potassium lauryl sulfate, sodium lauryl sulfate, ammonium lauryl sulfate, sodium, potassium, and ammonium salts of phosphate esters of ethoxylated alkanols, and the like. The amount of the anionic surfactant used is ordinarily between about 0.01 percent and 2.5 percent by weight based on the weight of the monomers. In general it has been found that as the amount of acrylic acid or methacrylic acid in the monomer mixture is increased, the amount of the anionic surfactant that is necessary to obtain a product having a particular particle size is decreased. When the monomer mixture contains 5 percent or more of the acid, no anionic surfactant need be added to the polymerization medium to produce uniform very small particles of polymer. Since the presence of anionic surfactants may have a deleterious effect on the clarity, heat stability, water resistance, and other properties of articles prepared from the polymers, the minimum amount of the anionic surfactant that will yield polymer in the desired form is ordinarily used.

The process of this invention may be used to control the particle size and particle size distribution of a wide variety of vinyl halide polymers. These include vinyl halide homopolymers as well as polymers formed by the polymerization of a vinyl halide with an essentially water-insoluble ethylenically-unsaturated monomer that is co-polymerizable with the vinyl halide. Suitable comonomers include vinyl acetate, vinyl propionate, vinyl stearate, vinyl benzoate, styrene, methyl methacrylate, ethyl acrylate, allyl acrylate, acrylamide, acrylonitrile, methacrylonitrile, vinylidene chloride, dialkyl fumarates and maleates, and the like. The vinyl halide is ordinarily and preferably vinyl chloride. When one of the aforementioned comonomers is used, it is generally preferred that the monomer mixture contain at least 70 percent by weight of the vinyl halide. Particularly satisfactory results have been obtained using monomer mixtures that contain either 90 to 99 percent by weight of vinyl chloride and 1 to 10 percent by weight of acrylic acid and/or methacrylic acid or 75 to 90 percent by weight of vinyl chloride, 5 to 15 percent by weight of vinyl acetate, and 1 to 10 percent by weight of acrylic acid and/or methacrylic acid.

The suspension polymerizations of this invention are carreid out in the conventional manner. The polymerization is generally carried out at a temperature in the range of 30° C. to 70° C. in the presence of about 0.005% to 2%, based on the weight of the monomers, of a free radical generating polymerization initiator, such as lauroyl peroxide, benzoyl peroxide, diisopropylperoxy dicarbonate, tertiary butyl peroxypivalate, azobisisobutyronitrile, and the like. The polymers produced may be dried by spray-, drum-, or tray-drying techniques or by any other known technique for drying polymeric materials. Common additives, such as plasticizers, pigments, fillers, heat and light stabilizers, and the like, may be added in the amounts ordinarily used for these purposes to modify the properties of the polymers.

The polymers prepared by the process of this invention may be used in the production of coatings, films and shaped articles by molding, extruding, calendering, solvent-casting, and other processes of treatment and fabrication commonly applied to vinyl chloride polymers. These polymers may also be compounded or blended with other polymeric materials.

The invention is further illustrated by the examples that follow. In these examples all parts and percentages are parts by weight and percentages by weight.

EXAMPLE 1

A series of polymers was prepared by polymerizing vinyl chloride alone or in the presence of small amounts of acrylic acid or methacrylic acid in a stirred autoclave at 62° C. for about 10 hours. The polymers were dried overnight in a forced air convection oven at 50° C. to reduce their moisture contents to less than 0.3 percent.

The particle size distribution of the polymers was determined using the U.S. Standard Sieve Series (Newark Wire & Cloth Co.) on a Ro-Tap testing sieve shaker. The analysis was made on about 70 grams of polymer of which 1 gram of flake graphite had been added as an antistatic agent. The polymer in the sieve was shaken for 15 minutes on the shaker during which time particles of the polymer passed through those screens whose diameters were larger than their own and retained on that screen whose mesh size was smaller than the particle diameter. Those particles passing through all of the sieves were collected in the bottom pan. The results of the test are reported as the percent of the polymer retained by a particular mesh screen or collected in the bottom pan. The relationship between screen sieve size and particle size in microns is as follows:

| Mesh sieve No.: | Particle size (Microns) |
|---|---|
| 40 | 420 |
| 50 | 297 |
| 60 | 250 |
| 70 | 210 |
| 80 | 177 |
| 100 | 149 |
| 120 | 125 |
| 140 | 105 |
| 200 | 74 |
| 325 | 44 |

The polymerization formulas used and the particle size distribution of the polymers obtained are set forth in Table I. From the data in this table it will be seen that the particles of the polymers prepared from vinyl chloride and 1 percent (Ex. 1B) or 2 percent (Ex. 1C) of acrylic acid or 1 percent (Ex. 1D) of methacrylic acid were much smaller and more uniform in size than those of the vinyl chloride homopolymer (Ex. 1A).

TABLE I

| | Ex. 1A | Ex. 1B | Ex. 1C | Ex. 1D |
|---|---|---|---|---|
| Polymerization formula, parts: | | | | |
| Vinyl chloride | 100.0 | 99.0 | 98.0 | 99.0 |
| Acrylic acid | | 1.0 | 2.0 | |
| Methacrylic acid | | | | 1.0 |
| Water (deionized) | 175.0 | 175.0 | 175.0 | 175.0 |
| Lauroyl peroxide | 0.25 | 0.25 | 0.25 | 0.25 |
| Sodium dodecylbenzene sulfonate | 2.0 | 2.0 | 2.0 | 2.0 |
| Particle size distribution of polymer, percent: | | | | |
| Mesh sieve No.: | | | | |
| 40 | 92.1 | 0.4 | 0.2 | 0.2 |
| 50 | 1.3 | 4.4 | 0.2 | 0.2 |
| 60 | 0.6 | 13.0 | 0.3 | 0.2 |
| 70 | 0.6 | 22.0 | 0.6 | 0.2 |
| 80 | 0.7 | 30.2 | 0.3 | 0.3 |
| 100 | 1.1 | 17.5 | 0.3 | 0.3 |
| 120 | 0.4 | 2.7 | 0.5 | 0.5 |
| 140 | 0.7 | 1.3 | 0.8 | 0.2 |
| 200 | 0.8 | 1.7 | 14.3 | 2.7 |
| 325 | 1.0 | 3.0 | 56.4 | 75.8 |
| Pan | 0.4 | 3.8 | 26.3 | 16.4 |

EXAMPLE 2

Vinyl chloride-vinyl acetate copolymers were prepared by the procedure described in Example 1. The polymerization formulas used and the particle size distribution of the polymers obtained are given in Table II.

TABLE II

| | Ex. 2A | Ex. 2B | Ex. 2C | Ex. 2D |
|---|---|---|---|---|
| Polymerization formula, parts: | | | | |
| Vinyl chloride | 90.0 | 88.0 | 90.0 | 88.0 |
| Vinyl acetate | 10.0 | 10.0 | 10.0 | 10.0 |
| Acrylic acid | | 2.0 | | 2.0 |
| Water (deionized) | 175 | 175 | 175 | 175 |
| Lauroyl peroxide | 0.25 | 0.25 | 0.2 | 0.2 |
| Sodium dodecylbenzene sulfonate | 2.0 | 2.0 | | |
| Sodium lauryl sulfate | | | 2.0 | 2.0 |
| Particle size distribution of polymer, percent: | | | | |
| Mesh sieve No.: | | | | |
| 40 | 95.9 | 0.3 | 96.4 | 0.5 |
| 50 | 0.4 | 0.2 | 0.2 | 2.2 |
| 60 | 0.3 | 0.3 | 0.2 | |
| 70 | 0.1 | 0.5 | | 0.2 |
| 80 | 0.3 | 0.2 | 0.3 | |
| 100 | 0.4 | 0.3 | 0.2 | 1.1 |
| 120 | 0.1 | 0.5 | 0.5 | 2.0 |
| 140 | 0.7 | 0.5 | 0.5 | 8.7 |
| 200 | 0.4 | 2.4 | 1.1 | 38.0 |
| 325 | 1.0 | 57.8 | 1.2 | 42.2 |
| Pan | 0.3 | 37.7 | 0.2 | 7.8 |

EXAMPLE 3

A series of vinyl chloride polymers was prepared by the procedure of Example 1. The polymerization formulas used and the particle size distribution of the polymers obtained are given in Table III. From these data it will be seen that the addition of maleic acid and of itaconic acid, unlike that of acrylic acid and methacrylic acid, has little effect on the particle size of the product.

TABLE III

| | Ex. 3A | Ex. 3B | Ex. 3C | Ex. 3D | Ex. 3E | Ex. 3F |
|---|---|---|---|---|---|---|
| Polymerization formula, parts: | | | | | | |
| Vinyl chloride | 100 | 98.0 | 99.0 | 99.0 | 98.0 | 98.0 |
| Acrylic acid | | 2.0 | | | | |
| Methacrylic acid | | | 1.0 | | | |
| Maleic acid | | | | 1.0 | 2.0 | |
| Itaconic acid | | | | | | 2.0 |
| Water (deionized) | 175 | 175 | 175 | 175 | 175 | 175 |
| Lauroyl peroxide | 0.2 | 0.2 | 0.2 | 0.2 | 0.2 | 0.2 |
| Sodium lauryl sulfate | 2.0 | 2.0 | 2.0 | 2.0 | 2.0 | 2.0 |
| Particle size distribution of polymer, percent: | | | | | | |
| Mesh sieve No.: | | | | | | |
| 40 | 75.3 | 0.1 | 0.1 | 72.7 | 65.4 | 74.3 |
| 50 | 1.2 | 0.6 | 0.1 | 1.5 | 1.3 | 5.2 |
| 60 | 0.5 | 1.1 | 0.1 | 0.3 | 0.5 | 2.9 |
| 70 | 0.7 | 2.9 | 0.1 | 0.5 | 1.5 | 3.6 |
| 80 | 1.2 | 4.6 | 0.8 | 1.4 | 2.0 | 1.8 |
| 100 | 2.3 | 7.8 | 0.4 | 2.4 | 4.8 | 2.0 |
| 120 | 3.8 | 8.7 | 0.4 | 4.5 | 6.6 | 2.2 |
| 140 | 3.2 | 8.5 | 0.6 | 3.6 | 5.6 | 1.6 |
| 200 | 5.2 | 32.1 | 9.2 | 8.9 | 10.1 | 1.8 |
| 325 | 3.3 | 29.8 | 81.2 | 3.8 | 1.7 | 1.6 |
| Pan | 1.8 | 4.1 | 6.6 | | 0.3 | 3.1 |

EXAMPLE 4

A series of vinyl chloride and vinyl chloride-vinyl acetate polymers was prepared by the procedure of Example 1 using an organic phosphate as the anionic surfactant. The polymerization formulas used and the particle size distribution of the polymers obtained are given in Table IV.

TABLE IV

|  | Ex. 4A | Ex. 4B | Ex. 4C | Ex. 4D |
|---|---|---|---|---|
| Polymerization formula, parts: |  |  |  |  |
| Vinyl chloride | 100.0 | 98.0 | 90.0 | 88.0 |
| Vinyl acetate |  |  | 10.0 | 10.0 |
| Acrylic acid |  | 2.0 |  | 2.0 |
| Water (deionized) | 175.0 | 175.0 | 175.0 | 175.0 |
| Lauroyl peroxide | 0.25 | 0.25 | 0.25 | 0.25 |
| Sodium salt of an organic phosphate ester of an ethoxylated alkanol (Ultraphos 12) (pH=8) | 2.0 | 2.0 | 2.0 | 2.0 |
| Particle size distribution of polymer, percent: |  |  |  |  |
| Mesh sieve No.: |  |  |  |  |
| 40 | 83.5 | 0.2 | 80.4 | 1.3 |
| 50 | 5.5 | 0.2 | 6.1 | 0.2 |
| 60 | 2.0 | 0.2 | 2.4 | 0.2 |
| 70 | 1.6 | 0.2 | 2.0 | 0.2 |
| 80 | 1.7 | 0.5 | 2.3 | 0.6 |
| 100 | 1.6 | 1.5 | 1.8 | 1.4 |
| 120 | 1.2 | 1.4 | 1.2 | 1.6 |
| 140 | 0.6 | 1.5 | 1.1 | 1.6 |
| 200 | 1.0 | 24.2 | 1.2 | 37.6 |
| 325 | 1.3 | 67.5 | 1.5 | 39.0 |
| Pan | 0.1 | 4.4 | 1.5 | 16.7 |

From the data in Tables I to IV it will be seen that when a small amount of acrylic acid or methacrylic acid was added to a vinyl halide polymerization mixture that contained an anionic surfactant the particles of the polymers obtained were much smaller than those of polymers prepared in the absence of these acids or in the presence of other ethylenically unsaturated carboxylic acids. As has been indicated, equivalent results can be obtained in the absence of an anionic surfactant when at least 5 percent by weight of the acid is used.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. In the process for the aqueous suspension polymerization of a monomer component selected from the group consisting of (a) vinyl chloride and (b) mixtures containing about 70 percent to 95 percent of vinyl chloride and about 5 percent to 30 percent of vinyl acetate in the presence of a free radical generating initiator and 0.01 percent to 2.5 percent by weight of an anionic surfactant at a temperature in the range of 30° C. to 70° C., the improvement that comprises adding to the monomer component prior to the start of the polymerization reaction about 0.5 percent to 20 percent, based on the weight of the monomer component, of an acid selected from the group consisting of acrylic acid and methacrylic acid.

2. The process of claim 1 wherein the monomer component that is polymerized contains about 75 percent to 90 percent by weight of vinyl chloride, 5 percent to 15 percent by weight of vinyl acetate, and 1 percent to 10 percent by weight of acrylic acid.

3. The process of claim 1 wherein the monomer component that is polymerized contains about 75 percent to 90 percent by weight of vinyl chloride, 5 percent to 15 percent by weight of vinyl acetate, and 1 percent to 10 percent by weight of methacrylic acid.

4. The process of claim 1 wherein the monomer component that is polymerized contains 90 percent to 99 percent by weight of vinyl chloride and 1 percent to 10 percent by weight of acrylic acid.

5. The process of claim 1 wherein the monomer component that is polymerized contains 90 percent to 99 percent by weight of vinyl chloride and 1 percent to 10 percent by weight of methacrylic acid.

6. The process of claim 1 wherein the polymerization initiator is lauroyl peroxide.

7. The process of claim 1 wherein the anionic surfactant is a sodium alkyl sulfate.

8. The process of claim 1 wherein the anionic surfactant is a sodium alkyl aryl sulfonate.

References Cited

UNITED STATES PATENTS

| 3,226,350 | 12/1965 | Smith | 260—29.6 |
| 3,332,918 | 7/1967 | Benatta | 260—85.5 |
| 3,370,031 | 2/1968 | Grommers | 260—29.6 |
| 3,404,114 | 10/1968 | Snyder | 260—29.6 |
| 3,375,238 | 3/1968 | Bauer | 260—92.8 |

JOSEPH L. SCHOFER, Primary Examiner

C. A. HENDERSON, Jr., Assistant Examiner

U.S. Cl. X.R.

260—78.5, 80.8, 85.5, 86.3, 87.5, 87.7